N. & J. N. THOMAS.
WIRE OR BAND TIGHTENING IMPLEMENT.
APPLICATION FILED MAY 26, 1906.

954,226.

Patented Apr. 5, 1910.

Witnesses:

Inventors

UNITED STATES PATENT OFFICE.

NICHOLAS THOMAS AND JAMES N. THOMAS, OF BURLINGTON, WISCONSIN.

WIRE OR BAND TIGHTENING IMPLEMENT.

954,226. Specification of Letters Patent. Patented Apr. 5, 1910.

Application filed May 26, 1906. Serial No. 318,978.

*To all whom it may concern:*

Be it known that we, NICHOLAS THOMAS and JAMES N. THOMAS, citizens of the United States, residing at Burlington, in the county of Racine and State of Wisconsin, have invented certain new and useful Improvements in Wire or Band Tightening Implements; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an implement for tightening binding bands or wires around packing boxes, bales or packages, for the purpose of bracing or strengthening the boxes, or for binding the parts together.

The object of the invention is to provide such an implement simple in its construction, efficient in operation, and capable of quick and easy manipulation without the employment of skilled labor, and in which opposite parts of the wire or band will be drawn one toward the other to make the wire or band taut and held by the implement in such condition while the ends are twisted together, or otherwise securely fastened.

To the accomplishment of the foregoing and such other objects as may hereinafter appear, the invention consists in the features of construction and elements of combination hereinafter particularly described and then sought to be clearly defined by the claims, reference being had to the accompanying drawing forming a part hereof and in which—

Figure 1:
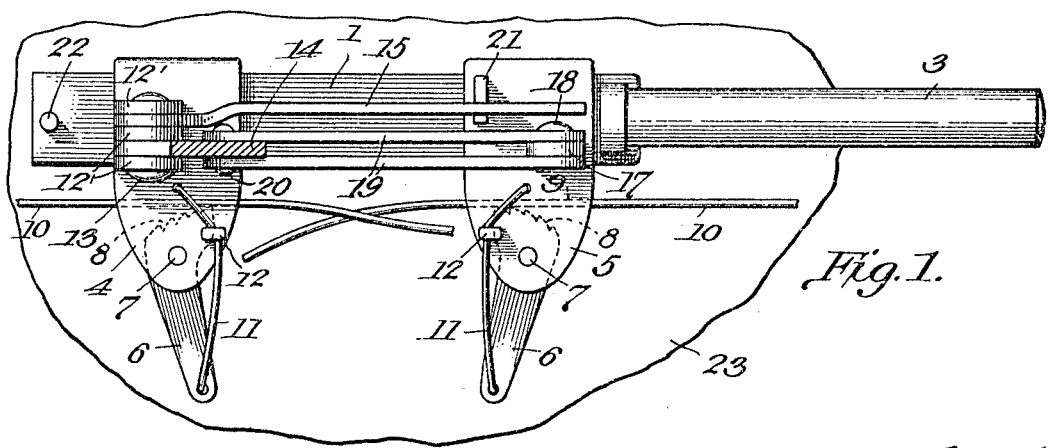
Figure 2:
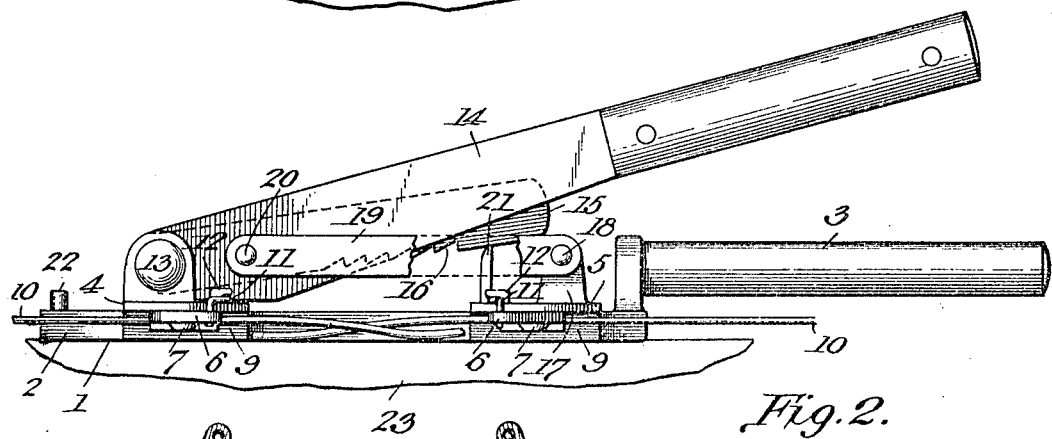
Figure 3:
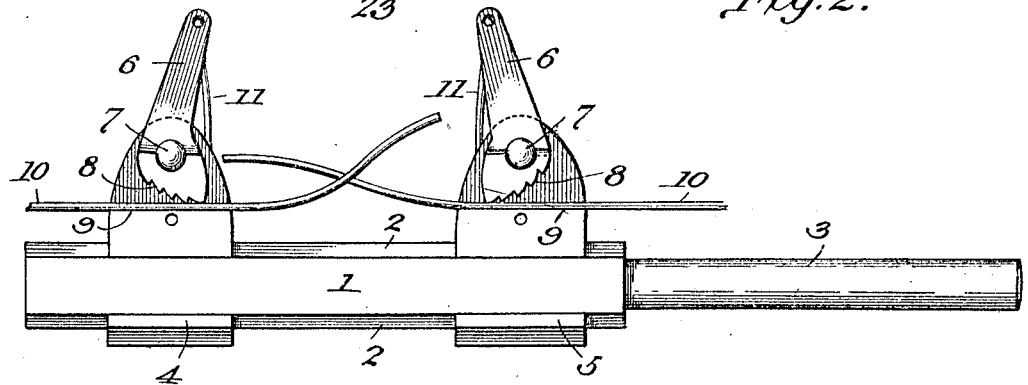

Figure 1 is a plan view of the implement with its operating lever in section and showing a portion of a box and parts of a binding wire; Fig. 2 is a side elevation of the same parts in position to operate, with a portion of one link broken away, and Fig. 3 is a bottom plan view of the implement.

In the drawing, the numeral 1 indicates what for convenience we will designate a guiding-base which preferably is formed with beveled sides 2 and has a handle 3 which preferably is formed in one piece therewith. Upon the guiding-base is mounted a slide or slides, two of such slides 4 and 5 being illustrated, which are formed with dovetailed recesses or grooves receiving the dovetailed guiding-base and upon which they are capable of being reciprocated. Each slide is provided with a gripping-dog 6 pivoted thereto by a pivot-pin 7 and having a cam face 8 which preferably is serrated or formed with teeth as shown, and opposite to which the slide is formed with a shoulder 9 against which the binding band or wire, designated by the numeral 10, will be gripped by the gripping-dog. The gripping-dogs are normally held in gripping position by a suitable spring or springs, for instance, by springs 11 which in the form selected for illustration consist of spring wire having one end secured to the dog and the other end to the slide and between the ends bearing against a suitable lug 12 on the slide so as to impart tension to the spring.

The slide 4 is formed with one or more ears 12 to which is pivotally connected by a pivot pin 13 one end of an operating lever 14, and also a locking pawl or dog 15 which latter is formed with teeth 16 on its lower edge or face. The other slide 5 is formed with an ear 17 to which is connected by a pivot pin 18 one end of a link, preferably consisting of two parallel bars, 19, the other end of which link is connected by a pivot pin 20 to the operating lever 14. The slide 5 also carries an upright catch or tooth 21 designed to have the toothed locking pawl or dog 15 to engage therewith to lock the slides 4 and 5 while the ends of the binding band or wire are being fastened. A pin or stop 22 prevents the slide next thereto from sliding entirely off the guiding base.

The numeral 23 indicates a portion of a box which is to be bound.

In operation, one portion of the binding band or wire 10 is slipped under one of the gripping-dogs 6, and the wire then passed around the box and slipped under the other gripping-dog, the wire being held by the dogs against the opposing shoulders 9. The operating lever 14 is then raised which movement draws the two slides toward each other, and pulls the wire taut from both directions, the greater the tension the tighter gripping of the wire by the cam gripping dogs. When the desired tautness has been obtained the engagement of the locking dog 15 with the tooth or catch 21 securely holds the slides at the position to maintain the tautness so that the operator may let go of the implement while he fastens the ends of the wire by twisting or otherwise. Thus it will be seen that the implement is simple and efficient and capable of quick manipulation. It will also be observed that if either of the slides should be fixed, or held stationary, the other slide would be moved toward it by manipulation of the hand lever and thus the wire would be drawn taut by the pull of the moving slide thereon while the other slide, or rather its gripping-dog, would firmly grip the wire at that point.

We have described with particularity the preferred details of construction of the several parts but it is obvious that changes can be made without departing from the invention coming within the scope of the appended claims.

Having described our invention and set forth its merits, what we claim is:—

1. The wire or band tightening implement comprising a guide-bar or base, slides both of which are movable toward and from each other on said guide-bar and carrying gripping-dogs, a lever pivotally connected with one of said slides, and a link connecting said lever with the other slide, substantially as and for the purposes described.

2. The wire or band tightening implement comprising a guide-bar or base, a slide movable on said bar and carrying a wire or band gripping device, a lever and a link connected together and one of them connected to the slide, a pivoted pawl for locking the slide to its adjustment, and a handle by which the implement may be held and manipulated, substantially as described.

3. The wire or band tightening implement comprising a guide-bar or base, slides movable on said guide-bar to and from each other, gripping dogs carried by said slides, a lever pivotally connected with one of the slides, a link pivotally connected with the other slide, said lever and link being pivotally connected together, and means for locking said slides in their adjustment while the wire or band is under tension, substantially as described.

4. The wire or band tightening implement comprising a guide-bar or base, slides movable on said guide-bar to and from each other, gripping dogs carried by said slides, the slides being formed with shoulders opposite to the gripping faces of the dogs, a lever pivotally connected with one of the slides, and a link pivotally connected with the other slide, said link and lever being pivotally connected together, substantially as described.

5. The wire or band tightening implement comprising a guide-bar or base, slides movable on said guide bar, gripping dogs carried by said slides, a lever pivotally connected with one of the slides, a link pivotally connected with the other slide, said lever and link being pivotally connected together, a locking pawl or dog mounted on one slide and a catch or tooth formed on another slide adapted to be engaged by the pawl or dog, substantially as described.

In testimony whereof we affix our signatures in presence of two witnesses.

NICHOLAS THOMAS.
JAMES N. THOMAS.

Witnesses:
C. A. HAMPE,
C. A. JONES.